Jan. 16, 1923.
L. A. DUNAJEFF.
TANK GAUGE.
ORIGINAL FILED OCT. 6, 1920.
1,442,134.
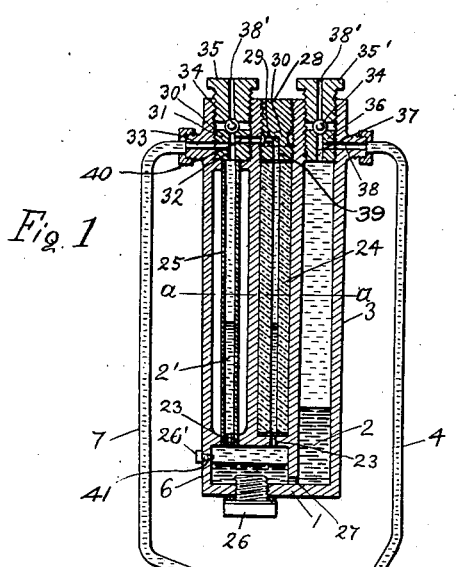
Fig. 1
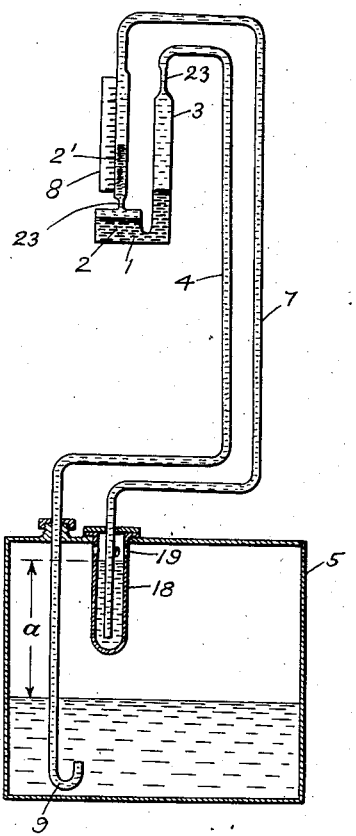
Fig. 2
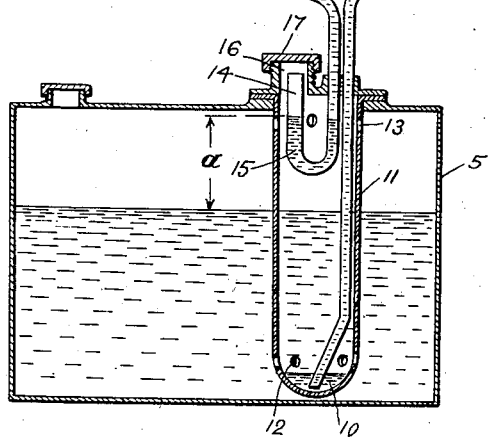
Fig. 3
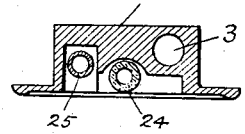
Fig. 4
SECTION a-a
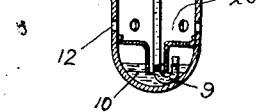
INVENTOR
Leonid A. Dunajeff Patented Jan. 16, 1923.

1,442,134

UNITED STATES PATENT OFFICE.

LEONID A. DUNAJEFF, OF NEW YORK, N. Y.

TANK GAUGE.

Original application filed October 6, 1920, Serial No. 414,969. Divided and this application filed February 18, 1921. Serial No. 446,155.

*To all whom it may concern:*

Be it known that I, LEONID A. DUNAJEFF, citizen of Russia, and resident of New York, in the county of New York and State of New York, have invented certain new and useful Improvements in Tank Gauges, of which the following is a specification.

My invention relates to tank gauges and has a particular reference to devices employing a liquid column to indicate directly the depth of a liquid in a tank. It has a further reference to indicators or gauges communicating with a tank by means of a system of pipes, containing various liquids in a balanced condition.

The object of my invention is to provide a liquid depth indicator which can be placed in any relative position with a tank, even at a considerable distance therefrom, above or below; also to provide a gauge unaffected by the temperature variations, and which can be properly adjusted to a tank of any shape and form.

This is a divisional application of my application Serial #414,969 filed October 6th, 1920, for tank gauges.

My invention is more fully described in the following specification and attached drawing in which:—

Figure 1 is a sectional elevation of my indicator, showing pipe connections with a tank, Figure 2 is a modification, Figure 3 is a sectional view of a modified tank tube and Figure 4 is a sectional plan view taken on the line $a$—$a$ of Fig. 1.

My tank gauge consists of a U shaped tube 1 partly filled with some comparatively heavy liquid 2, such as mercury. One leg 3 of this tube is connected through a pipe 4 with the bottom of a tank 5, and the other leg 6 is connected through a pipe 7 with the upper portion of the tank 5. Both of these pipes are filled with some liquid which may be the same as in the tank, so that the liquid in the pipes together with the mercury form an uninterrupted liquid column. The weight of the liquid in one of these pipes is partly balanced by the weight of the other, and the unbalanced portion is taken care of by the weight of the mercury in the U shaped tube, so that the relative displacement of the mercury columns in the U shaped tube indicates the difference of the weight between the liquid column in the pipes 4 and 7. This difference is zero when the tank is full and the liquid level reaches the height of the level of the liquid in the well 18. But any difference "$a$" between the levels will add an extra weight to the liquid column in the pipe 4 thereby producing a suction on the mercury in the leg 3. The mercury will accordingly recede from the leg 6, so that by observing the level in the leg 6 we may judge of the actual level of the liquid in the tank 5. By adding a suitably graduated scale 8 it may be possible to know the correct volume of the liquid in the tank at any observed level.

A colored liquid 2' may be employed in the leg 6 in order to make the readings easily discernible, and the leg may be formed of a transparent tube with a narrow central opening. A colored alcohol may be employed for instance, if the pipes are filled with gasoline.

The U shaped tube may be located in any relative position with reference to the tank, above or below, and at any practical distance therefrom. The readings are not affected by the temperature variations, as the temperature effect on the liquid in one of these pipes is balanced by the effect in the other. Slight variations due to the expansion or contraction of the mercury, may be completely balanced by adding a U shaped trap 14 at the end of the upper pipe 7 and making the open leg of this trap of a proper diameter, so that the added weight in this leg, due to the expansion of the liquid in the pipe 7, may bring the mercury in the tube 1 to its normal level in the leg 6, forcing the expanded excess into the leg 3 where it does not affect the readings.

The operating length of the liquid column in the pipe 7 varies to a certain extent with the variations in the mercury level, but these variations are constant for each position of the level in the tank and are taken care of in the proper graduation of the scale 8.

The pipe 4 has a U shaped portion or a trap 9 Fig. 2 at its lower end, so that the liquid could not escape from the pipe, when the tank becomes completely emptied. The same purpose may be also accomplished by immersing the end of the pipe 4 into a cup shaped bottom of a tubular well 11 Fig. 3 containing a small amount of a sealing liquid 10 and placed in the tank 5. Holes 12 above the level of the sealing liquid establish communication with the liquid in the tank, and holes 13 with the air in the tank, so that the liquid level in the well 11 is always the same as in the tank 5. The sealing liquid, such as glycerine, for instance, may be useful to prevent evaporation of the liquid from inside of the pipe 4 and 7, when the tank 5 remains empty for some length of time.

The well 11 is especially useful when the tank is subjected to disturbances in its position which may occur when it is located on a moving ship or on an automobile. The disturbances and violent fluctuations of the liquid level in the tank 5 will be considerably reduced inside of the tubular well, and the gauge readings will be accordingly dampened, especially if the holes 12 are made sufficiently small.

The pipe 7 has a liquid trap at the lower end which consists of a U shaped portion 14 with a sealing liquid 15. This trap may be placed in the upper end of the tubular well 11 with the open end of the pipe 7 in the highest position near the opening 16 with a closing cap 17, as shown in Fig. 1.

Instead of having a U shaped portion, the lower end of the pipe 7 may be immersed in a sealing liquid in a separate tubular well 18 with the air vents 19 in its upper portion, as shown in Fig. 2.

My tank gauge with slight changes may be also used on aeroplanes. The changes consist in added features designed to prevent the various liquids from getting permanently displaced and disarranged, when the aeroplane flies upside down. For instance, the end of pipe 4 may be placed inside of an inverted funnel 20 (Figure 3) in the tubular well 11, so that the sealing liquid 10 cannot become spilled or displaced under any circumstances, even when the well is completely upset. A small well 21 with an inverted funnel 22 may protect the end of the pipe 7 in a similar manner.

The pipes 4 and 7 may be provided with considerably reduced portions 23 near the U shaped tube so as to prevent the mercury from escaping along these pipes in an inverted position of the gauge, as the mercury cannot flow through very small openings.

In order to render the readings of my gauge more accurate, I provide the U shaped tube 1, Fig. 1, with an especially enlarged well 6 so as to reduce the variations in its mercury level. An index glass tube 24 is in a direct communication with this well 6 and contains some colored liquid, such as alcohol. The inside diameter of this index tube is very small, so that the level of the colored liquid will vary considerably with the smallest variations in the height of the mercury column. Another tube 25 is connected with the well 6 and also contains the colored liquid at the same level as in the tube 24. This additional or correcting tube 25 is made of some pliable material, such as lead, and serves only to adjust the readings of the scale 8. This adjustment may be made for each division of the scale by pinching the correcting tube more or less in places corresponding to the divisions being corrected. By pinching, we will reduce the volume of the tube, so that the colored liquid will rise higher in the tube 24. The zero mark may be adjusted by means of an adjusting plug 26 which may be screwed more or less deeply into the chamber or well 6.

In order to prevent the colored liquid from getting into the leg 3 of the U shaped tube, the communicating hole 27 between the legs of this tube is located at the very bottom of it.

The heavy liquid is introduced into the lower portion of the U shaped tube through an aperture 41 which is ordinarily closed with a plug 26'.

The glass tube 24 and the pliable tube 25 are clamped in their positions with screw plugs 28 and 31 and are in a communication with each other through an aperture 39, passage 29, circular recess 30, and passages 32 and 40.

The central aperture 32 is closed on top with a ball 34, and the space above is closed with a screw plug 35 with a small central aperture 38'.

A plug 36 with a central hole 37 is fitted in the upper portion of the tube 3. A side hole 38 is in a communication with the pipe 4. The central hole 37 is closed with a ball 34 and a plug 35'.

When my tank gauge is installed, for instance, on an automobile it must be filled with proper liquids. For this purpose the plug 28 is removed, and the plug 35' loosened. The mercury is then poured in until it shows at the plug hole 26' which is then closed again. Next the proper amount of the colored alcohol or a similar liquid is introduced. In order to fill the pipes 4 and 7 a suction pipe is applied to the holes 38', and when the liquid, such as gasoline, fills all the pipes and connections, then the plugs 35 and 35' are screwed tight to close the openings with the balls 34. Or the plugs and the balls may be entirely removed, and the liquid poured in from the top. The U-shaped or other traps at the ends of the pipes 4 and 7 may be filled afterwards with glycerine or other suitable liquid, which must be heavier than the liquid in the tank and these liquids must not make a solution or otherwise affect each other. This heavy liquid is poured in the tubes 14 and 11 before the suction is completed. The excess of the liquid may be removed afterwards.

Important advantages of my tank gauge are that it shows accurately the smallest variations of the liquid level in the tank, that it can operate in any relative position with the tank, that the accuracy of its readings is not affected by the temperature variations, that it does not require any attention or adjustments after first proper installation, that it can be used on moving objects, such as automobiles, ships and aeroplanes, that it can be used with the tanks containing a liquid under pressure or vacuum, and that it has no mechanical moving parts to become damaged or worn out.

I claim as my invention:—

1. A tank gauge, the combination with a U shaped tube, a heavy liquid partly filling said tube, a pipe connecting one leg of said tube with the tank, a pipe connecting another leg of said tube with the tank, a plurality of liquids in said pipes in direct contact with said heavy liquid, U-shaped extensions on the ends of said pipes in the tank, and tubular wells with inverted funnels covering said U-shaped extensions.

2. In a tank gauge, the combination with a U shaped tube, a heavy liquid partly filling said tube, one leg of said tube being made of a transparent material, a correcting tube made of a pliable material and placed alongside of said transparent tube, said transparent and said pliable tubes having communicating passages at the top and at the bottom, a pipe extending from the other leg of said U shaped tube to the bottom of the tank, a pipe extending from the communicating passage at the top of said transparent and said pliable tubes to the top of the tank, a trap at the end of said last named pipe inside of said tank, a colored liquid in said transparent tube, and light liquid in said communicating pipes between said U shaped tube and said tank.

3. In a tank gauge, the combination with a U shaped tube located at the point of observation and above the tank, one leg of said U shaped tube being made of a transparent material, a comparatively large container forming a connection between the lower ends of the legs of said U shaped tube, a heavy liquid partly filling said U shaped tube, a colored liquid partly filling said transparent tube on top of said heavy liquid, a pipe connecting the upper end of said transparent tube with the top of the tank and terminating with a U shaped extension inside of the tank, a heavy balancing liquid in said U shaped extension, a light liquid in said connecting pipe filling the space between said colored liquid and said balancing liquid, a pipe connecting the other leg of said U shaped tube with the bottom of the tank, and a light liquid filling said second connecting pipe.

4. In a tank gauge, the combination with a U shaped tube at the point of observation, one leg of said U shaped tube being made of a transparent material, a heavy liquid partly filling said U shaped tube, a pipe extending from one leg of said U shaped tube to the top of a tank and terminating with a U shaped extension inside of said tank, a heavy liquid partly filling said U shaped extension, a light liquid filling said connecting pipe, a pipe extending from the other leg of said U shaped tube to the top of said tank and from there to the bottom of said tank, a light liquid filling said second connecting pipe, and a tubular well enclosing said pipe extensions in said tank.

5. In a tank gauge, the combination with a U shaped tube at the point of observation, one leg of said tube being made of a transparent material, a heavy liquid partly filling said U shaped tube, a pipe extending from one leg of said tube to the top of a tank and terminating with a U shaped extension, a heavy balancing liquid in said U shaped extension, a light liquid in said connecting pipe, a pipe extending from the other leg of said U shaped tube to the bottom of said tank, and a light liquid filling said second connecting pipe.

6. In a tank gauge, the combination with a U shaped tube at the point of observation, one leg of said U shaped tube being made of a transparent material, a heavy liquid partly filling said U shaped tube, a pipe extending from one leg of said tube to the top of a tank and terminating with a U shaped extension inside of said tank, a heavy balancing liquid partly filling said U shaped extension, a light liquid filling said connecting pipe, a pipe extending from the other leg of said U shaped tube to the bottom of said tank, and a light liquid filling said second connecting pipe, the diameter of the open leg of said U shaped extension and the quantity of said heavy balancing liquid being proportioned so as to balance the pull produced on said heavy liquid in said U shaped tube by the longer liquid column in said first connecting pipe.

7. In a tank gauge, the combination with a U shaped tube, a heavy liquid partly filling said tube, a pipe extending from one leg of said U shaped tube to the top of the tank and terminating with a trap containing a heavy liquid, a light liquid filling said connecting pipe, a second pipe extending from the other leg of said U shaped tube to the bottom of said tank, a light liquid filling said second connecting pipe, and means to prevent the evaporation of the liquid in said second connecting pipe when the tank is empty.

8. In a tank gauge, the combination with a U shaped tube, a heavy liquid partly filling said tube, pipes extending from the legs of said U shaped tube to the top of the tank, light liquid filling said pipes, one of said pipes terminating with a trap inside of said tank, said trap containing a heavy liquid, and the other pipe extending through the top of the tank to its bottom and immersed in a cup shaped well containing a non evaporating liquid.

9. In a tank gauge, the combination with a U shaped tube, a comparatively heavy liquid in said U-tube, a pipe extending from one leg of said U-tube to the bottom of a tank, a comparatively light liquid filling said pipe and being in a direct contact with a liquid in said tank, a second pipe extending from the other leg of said U-tube to the level of the top of said tank and connected with a downward tubular extension, the lower end of said downward extension being connected with the lower end of an upward tubular extension, the upper end of said upward extension being open, a comparatively heavy liquid in said extensions, a comparatively light liquid filling said second connecting pipe and being in a direct contact with the heavy liquids in said extensions and said U-tube, means to prevent the escapement of the liquid from said first connecting pipe when the tank is empty, one leg of said U-tube being made of glass, and a scale in a coordination with said U-tube, the line of separation of said liquids in said U-tube forming an indicating level.

10. In a tank gauge, the combination with a U-tube, a pipe extending from one leg of said U-tube to the bottom of a tank, a second pipe extending from the other leg of said U-tube to the level of the top of said tank and connected with the upper end of a tubular extension, the lower end of said extension being connected with the lower end of another tubular extension open at its upper end, said tubular extensions forming a trap, one leg of said U-tube being made of glass, a scale in a coordination with said U-tube, and a plurality of non mixing liquids of different gravities filling said tubes and said pipes and forming an uninterrupted liquid column between the liquid in said tank and an open level in said tubular extension, the line of separation of said liquids in said U-tube forming an indicating level.

11. In a tank gauge, the combination with a U-tube, a pipe extending from one leg of said U-tube to the bottom of a tank, a pipe extending from the other leg of said U-tube to the level of the top of said tank and connected with one end of a U-shaped extension, the other end of said extension being open, one leg of said U-tube being made of glass, a scale in a coordination with said U-tube, a plurality of liquids of different gravities filling said tubes and said pipes, the line of separation of said liquids in said U-tube forming an indicating level, and means to adjust the total travel of said indicating level within limits of said scale and in proportion to the height of the liquid level in said tank.

Signed at New York in the county of New York and State of New York this 11th day of February A. D. 1921.

LEONID A. DUNAJEFF.